H. E. MASON.
DEVICE FOR HOLDING PISTON RINGS IN THEIR GROOVES.
APPLICATION FILED NOV. 14, 1913.
1,144,608.
Patented June 29, 1915.
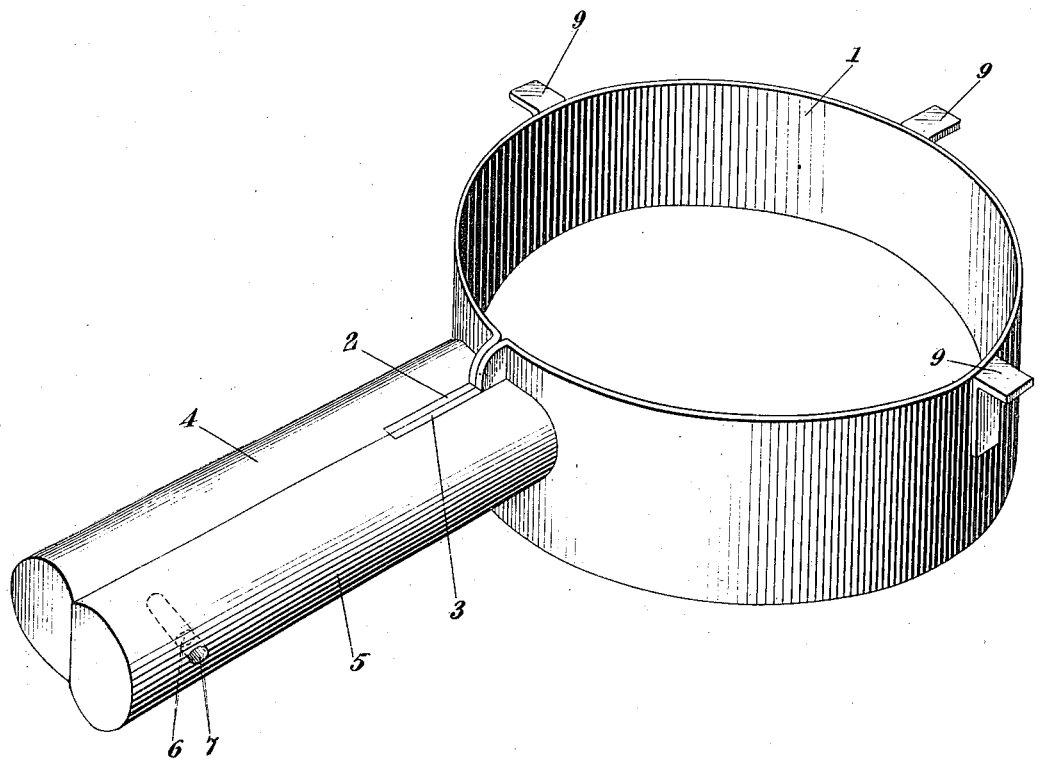
Witnesses:
L. Broderick
J. Freudenvoll
Inventor
Homer Elton Mason
By his Attorneys
Brindle & Wright

UNITED STATES PATENT OFFICE.

HOMER ELTON MASON, OF DELHI, NEW YORK.

DEVICE FOR HOLDING PISTON-RINGS IN THEIR GROOVES.

1,144,608.

Specification of Letters Patent.  Patented June 29, 1915.

Application filed November 14, 1913. Serial No. 800,901.

*To all whom it may concern:*

Be it known that I, HOMER ELTON MASON, of Delhi, in the county of Delaware and in the State of New York, have invented a certain new and useful Improvement in Devices for Holding Piston-Rings in Their Grooves, and do hereby declare that the following is a full, clear, and exact description thereof.

My invention relates particularly to a device adapted for holding piston rings in position on a piston while it is being inserted in a cylinder, and it is applicable especially for the holding of piston rings for use in explosion engines, but it is also adapted for use in connection with piston rings used upon pistons of all kinds and applied to any desired apparatus.

The object of my invention is to provide a device for holding piston rings in place so that they will be held in their seats on pistons while the pistons are being inserted in the cylinders in which they are intended to operate.

A further object of my invention is to provide a device for holding piston rings which may be used for holding the rings while the pistons are being inserted in the cylinders, without any danger of the holding device being drawn into the cylinder.

My invention is capable of embodiment in many different forms, but for the purpose of illustration I have shown only one form thereof in the accompanying drawings, in which—

The figure is a perspective view of a device for holding piston rings, made in accordance with my invention.

In the drawings I have shown a flexible band 1 of metal or any other suitable material, arranged in a substantially circular form and having its two ends 2 and 3 bent at right angles and reduced in width to form tongues for attachment to handles 4 and 5 which are substantially semi-circular in cross-section. The handles 4 and 5 and the tongues to which they are attached are made narrower than the circular band 1, in order to prevent the handles from interfering with the movement of the clamping device with the piston ring up to the very edge of the cylinder. One of the handles 4 is provided with an inwardly extending pin 6 which coöperates with a corresponding recess 7 in the handle 5 so as to bring the ends 2 and 3 of the band 1 into alinement. Around the edge of the band 1, I have provided a series of projections 9 in the form of right-angle brackets, for the purpose of preventing the edge of the clamping device from being drawn into the cylinder when the piston is being inserted therein. These projections are separate from one another so as to not interfere in any way with the bending of the band 1 so as to conform to the particular piston ring which is being held in its seat. When it is desired to place a piston in its cylinder, the piston rings, after being placed in their seats in the piston, are surrounded with the band 1 and the handles 4 and 5 brought together in such a manner that the projections 9 are on the side of the band 1 which is adjacent to the end of the cylinder. The ends 2 and 3 of the band 1 will be brought into alinement by the pin 6 projecting into the recess 7. The flexibility of the piston ring holder permits the same to be used in connection with piston rings varying somewhat in size, and the holder can be made to fit pistons of any size.

While I have described my invention above in detail, I wish it to be understood that many changes may be made therein within the scope of the appended claims without departing from the spirit of my invention.

I claim:

1. A device for holding piston rings in their seats, comprising a clamping means having a flexible band, and handles attached to the ends of the band, one of the handles having a pin and the other handle having a hole longer than the pin for bringing the same into alinement.

2. A device for holding piston rings in their seats, comprising a clamping means having a flexible band with right-angle brackets at one edge thereof, and handles attached to the ends of the band, one of the handles having a pin and the other handle having a hole longer than the pin for bringing the same into alinement.

3. A device for holding piston rings in their seats, comprising a clamping means having a flexible band with right-angle brackets at one edge thereof, and handles attached to the ends of the band, having means for bringing the same into alinement, the handles being narrower than the band.

4. A device for holding piston rings in their seats, comprising a clamping means having a flexible band with right-angle brackets at one edge thereof, and semi-circular handles attached to the ends of the band, having means for bringing the same into alinement, the handles being narrower than the band.

In testimony that I claim the foregoing I have hereunto set my hand.

HOMER ELTON MASON.

Witnesses:
HAMILTON J. HEWITT,
RICHARD R. HARRISON.